United States Patent
Rajasimman et al.

(10) Patent No.: US 8,385,293 B2
(45) Date of Patent: Feb. 26, 2013

(54) CELL BASE STATION NEIGHBOR LIST SELF CONFIGURATION

(75) Inventors: Vijayasimman Rajasimman, Richardson, TX (US); Nivedan Thadasina, Allen, TX (US); John C. Jubin, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 922 days.

(21) Appl. No.: 11/848,711

(22) Filed: Aug. 31, 2007

(65) Prior Publication Data

US 2009/0059867 A1 Mar. 5, 2009

(51) Int. Cl.
*H04W 4/00* (2009.01)

(52) U.S. Cl. ....................................................... 370/332

(58) Field of Classification Search .................. 370/332, 370/310, 328, 310.2, 320, 331, 333, 338, 370/465; 455/444, 442, 443, 432.1, 513, 455/436
See application file for complete search history.

(56) References Cited

U.S. PATENT DOCUMENTS

| | | | |
|---|---|---|---|
| 4,211,894 A * | 7/1980 | Watanabe et al. .............. 370/339 |
| 5,577,168 A | 11/1996 | Haas et al. | |
| 6,091,955 A | 7/2000 | Aalto et al. | |
| 6,178,327 B1 * | 1/2001 | Gomez ............................ 455/445 |
| 6,205,132 B1 | 3/2001 | Hong et al. | |
| 6,212,382 B1 * | 4/2001 | Watson et al. ................. 455/444 |
| 6,321,090 B1 | 11/2001 | Soliman | |
| 6,424,834 B1 | 7/2002 | Chang et al. | |
| 6,430,168 B1 | 8/2002 | Djurkovic et al. | |
| 6,621,811 B1 | 9/2003 | Chang et al. | |
| 6,640,100 B1 * | 10/2003 | Kojima et al. .............. 455/426.2 |
| 6,826,402 B1 | 11/2004 | Tran | |
| 6,928,283 B2 | 8/2005 | Rudolf | |
| 7,623,866 B1 * | 11/2009 | Spitzer ........................... 455/442 |
| 2002/0086675 A1 | 7/2002 | Mansour | |
| 2005/0048974 A1 * | 3/2005 | Kim et al. ....................... 455/436 |
| 2007/0097938 A1 * | 5/2007 | Nylander et al. ............. 370/338 |
| 2007/0191013 A1 * | 8/2007 | Gunnarsson et al. .......... 455/438 |
| 2009/0003279 A1 * | 1/2009 | Abusch-Magder et al. .. 370/331 |

OTHER PUBLICATIONS

Weal, Paul et al.; "Optimisation of CDMA-Based Mobile Telephone Networks: Algorithmic Studies on Real-World Networks"; University of Exeter, UK; 2006, 10 pgs.

* cited by examiner

*Primary Examiner* — Kwang B Yao
*Assistant Examiner* — Anh Ngoc Nguyen

(57) ABSTRACT

A code division multiple access telecommunications network including an underlay base station in a private premises and a plurality of overlay macro base stations. The underlay base station includes a GPS receiver and a mobile unit receiver. The underlay base station uses its geographic location to obtain information identifying macro base stations within a preselected distance of the underlay base station. It uses the mobile receiver to measure pilot signal strength of the macro base stations. It generates a neighbor list of the identified macro base stations ranked according to pilot signal strength.

20 Claims, 4 Drawing Sheets

CELL BASE STATION NEIGHBOR LIST SELF CONFIGURATION

CROSS-REFERENCE TO RELATED APPLICATIONS

None

STATEMENT REGARDING FEDERALLY SPONSORED RESEARCH OR DEVELOPMENT

Not applicable.

REFERENCE TO A MICROFICHE APPENDIX

Not applicable.

BACKGROUND

The present disclosure relates to cellular networks and more particularly to code division multiple access, CDMA, base stations which support self configuration of neighbor lists to enable handoff of mobile units between base stations.

Inadequate coverage is a persistent problem in the quality of service of any wireless network. Natural and man-made obstacles frequently create radio frequency (RF) holes, i.e. areas of low or no RF signal, in the coverage area of a wireless network. Voice and data call connections are frequently dropped when a wireless terminal, such as a cell phone or a similar mobile station, enters an RF hole. Typical areas in which RF holes occur include homes, apartments, underground tunnels and office buildings.

Conventional public CDMA cellular systems include a number of macro base stations arranged to provide service in contiguous cells. As mobile units move between cells, the mobile units are handed off between macro base stations to maintain continuous service. Each macro base station, MBS, maintains a neighbor list, comprising information identifying the MBSs for all contiguous cells. The neighbor list is communicated to the mobile units to enable handoff as the mobile units move into new cells. When a new MBS is installed, its neighbor list is manually generated by technicians based on the known location of the new MBS and locations of surrounding MBSs. Various RF measurements may be taken by the technicians to verify the power levels of nearby MBSs for the neighbor list. The manual generation of the neighbor list is expensive in terms of labor hours and equipment utilized, but is a small part of the overall cost of installing a MBS.

SUMMARY

In a CDMA telecommunication network, an underlay base station includes a GPS receiver providing geographic location of the underlay base station. The underlay base station transmits the location information to a server having a database of macro base stations in the network. The server returns a list of identifying information for macro stations within a preselected distance of the underlay base station. The macro station information is recorded as a neighbor list for the underlay base station.

In an embodiment, the underlay base station includes a mobile unit receiver. The receiver is operated to receive and measure the strength of beacon pilot signals from the identified macro base stations. The macro base stations on the neighbor list are ranked according to beacon signal strength. The neighbor list is provided to mobile units served by the underlay base station to facilitate hand off of the mobile units from the underlay base station to the macro base stations.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A "home base station" (HBS) can be used to fill an RF hole in a home for the home mobile devices, or mobile stations. HBSs are intended to serve only a small area, for example one private residence or business office, and a small number of wireless devices, e.g. mobile units. The number of HBSs is therefore expected to be much larger than the number of MBSs. Each HBS needs to have a neighbor list, just like a MBS, to enable handoff of mobile units from the HBS to a MBS when the mobile units move away from the HBS, e.g. move outside a private residence or other premises served by the HBS. For HBSs to be a commercial success, the cost of equipment and labor should be kept to a minimum.

Figure 1:
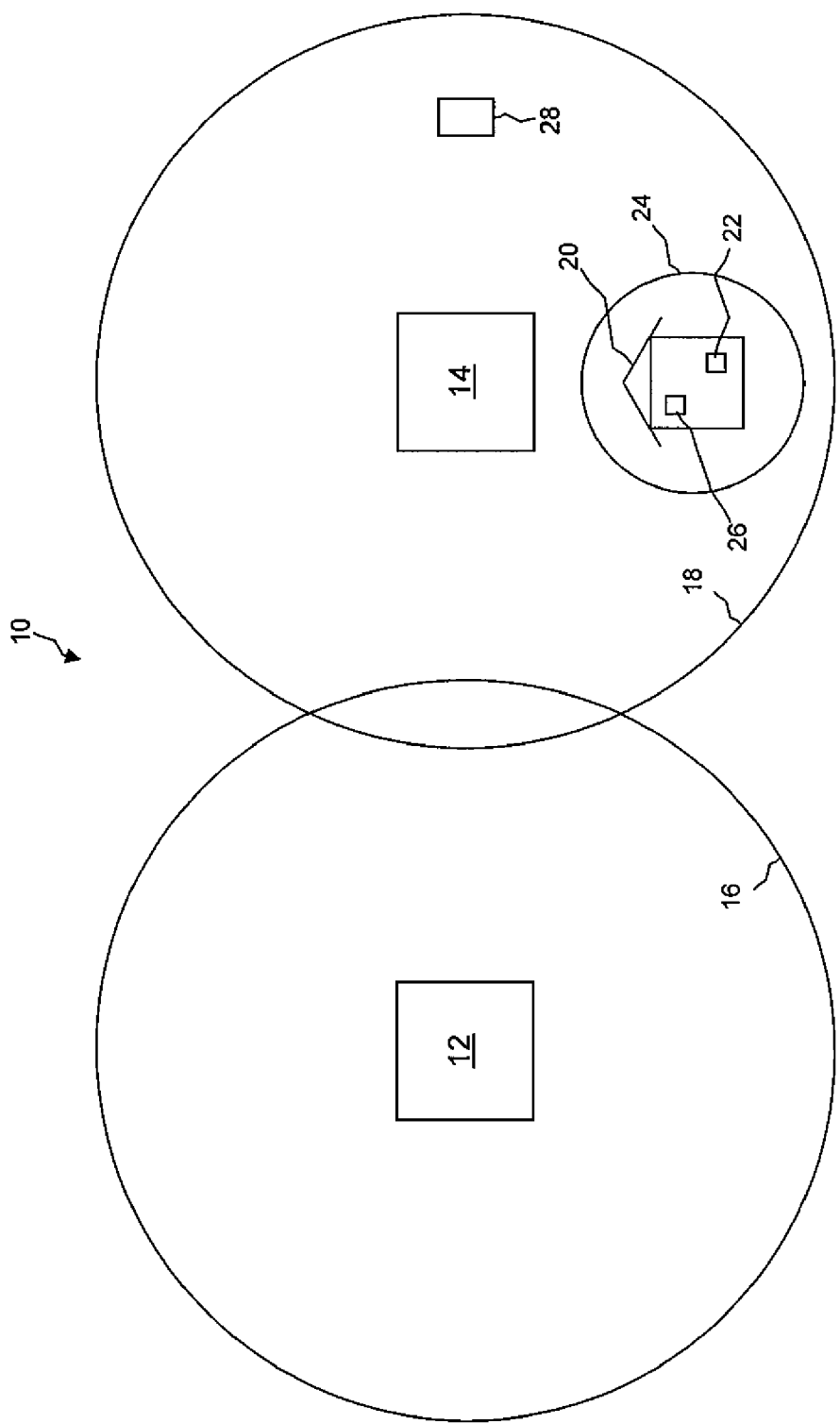
FIG. 1 is a general diagram of a CDMA cellular system overlaying a home base station.

FIG. 1 illustrates a CDMA cellular system 10 configured according to an embodiment. The system 10 includes a large number of macro base stations, MBSs, of which two MBSs 12 and 14 are shown in FIG. 1. MBS 12 serves a cell indicated by the circle 16 and MBS 14 serves a contiguous cell indicated by the circle 18. A private residence 20 is located within the cell 18. Within the residence 20 is located a home base station, HBS, 22. The HBS serves a small cell including the area enclosed by the residence 20 and possibly a small area immediately surrounding the residence 20 as indicated by the circle 24. A mobile unit, MU, 26 is shown within the residence 20 and therefore within the cell 24 and is served by the HBS 22. A second MU 28 is shown within the cell area 18, but outside the residence 20, and is served by the MBS 14. In this configuration, the cell 24 is considered an underlay cell relative to the cell 18 and the cell 18 is considered an overlay cell relative to the cell 24. The cell 16 and other cells may also be considered to be overlay cells relative to cell 24, depending on distance and signal strength as discussed below.

Mobile units 26 and 28 may be any suitable wireless devices (e.g., conventional cell phones, PCS handsets, personal digital assistant (PDA) handsets, portable computers, telemetry devices, etc.) that are capable of communicating with base stations 12, 14, 22 via wireless links. It should be understood that the use of the term "mobile unit" in the claims and in the description below is intended to encompass both truly mobile devices (e.g., cell phones, wireless laptops) and stationary wireless terminals (e.g., a machine monitor with wireless capability).

Figure 2:
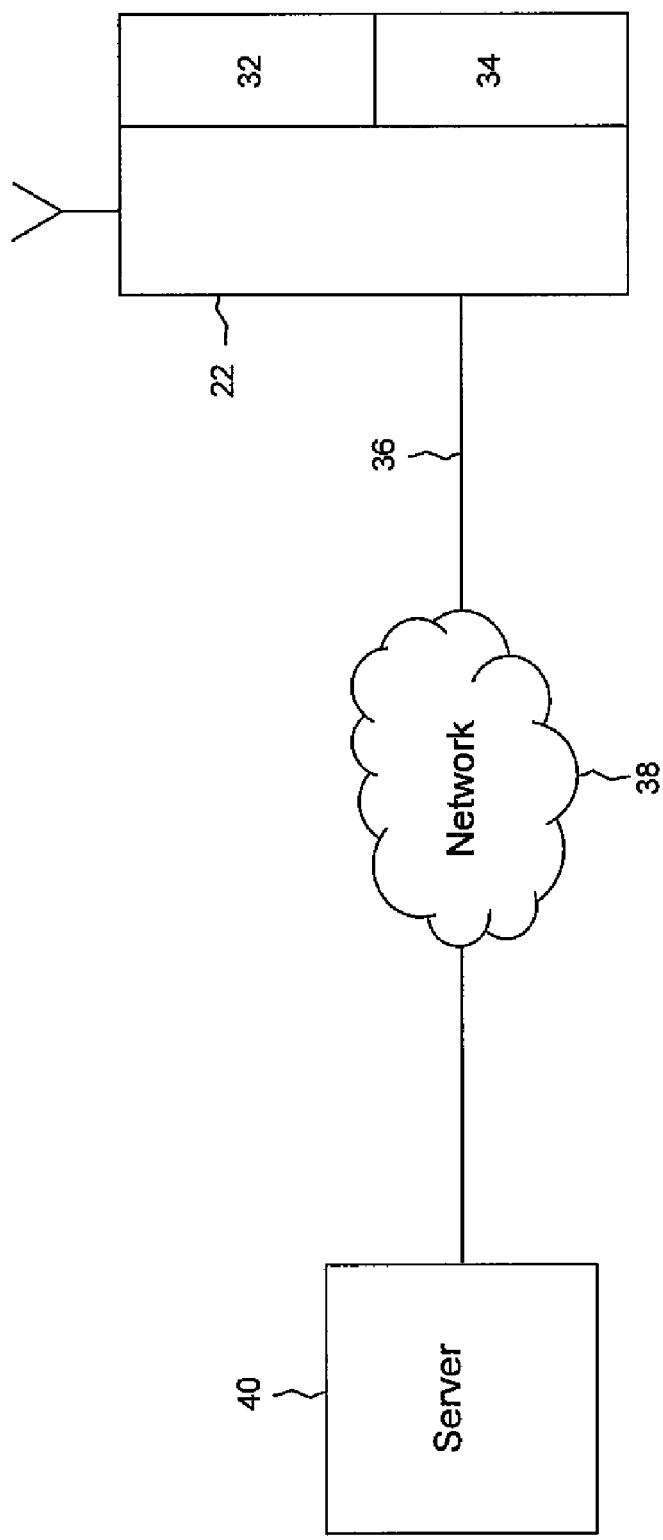
FIG. 2 is a block diagram of a home base station.

FIG. 2 illustrates more details of an embodiment of a HBS 22. The HBS 22 includes all the functional elements of a conventional CDMA base station, such as those used in MBSs 12 and 14. The HBS 22 includes an antenna 30 for communicating with mobile units. HBS 22 includes a global positioning satellite, GPS, receiver 32 for receiving position and timing information. In addition, HBS 22 includes a mobile module, or over the air receiver, 34 which provides the functionality of a mobile unit, such as MUs 26 and 28.

The HBS 22 has a connection 36 to a network 38, e.g. the Internet. The connection 36 may be through an ISP (Internet Service Provider) used by the occupants of the residence 20. The connection 36 may be any conventional IP (Internet Protocol) or other connection, but preferably is a high speed connection such as cable, DSL (digital subscriber line) or an optical fiber system. The HBS 22 connects through the connection 36 to a server 40 operated by the cellular telephone service provider. In this embodiment, the server 40 also stores information identifying the MBSs operated by the cellular telephone service provider, including MBSs 12 and 14.

The disclosed embodiments operate with conventional mobile units, i.e. no modifications are required for MU 26 or 28 to be provided service by the HBS 22. The HBS 22 may provide all or most of the functions normally provided by a MBS. One of those functions is providing a neighbor list to each MU which it serves. The neighbor list information is needed by the MU to enable hand over or hand off to a MBS, e.g. MBS 14 or 16, when a MU is moved from the cell 24. The HBS 22 of this embodiment is intended to be a private system serving private premises with a small number of mobile units. It is desirable that the cost of equipment and installation services be kept as low as possible. The disclosed embodiments provide an HBS 22 which may automatically and autonomously configure a neighbor list without manual intervention or assistance by a technician or by an occupant of the residence 20, which may result in reduced cost.

Figure 3:
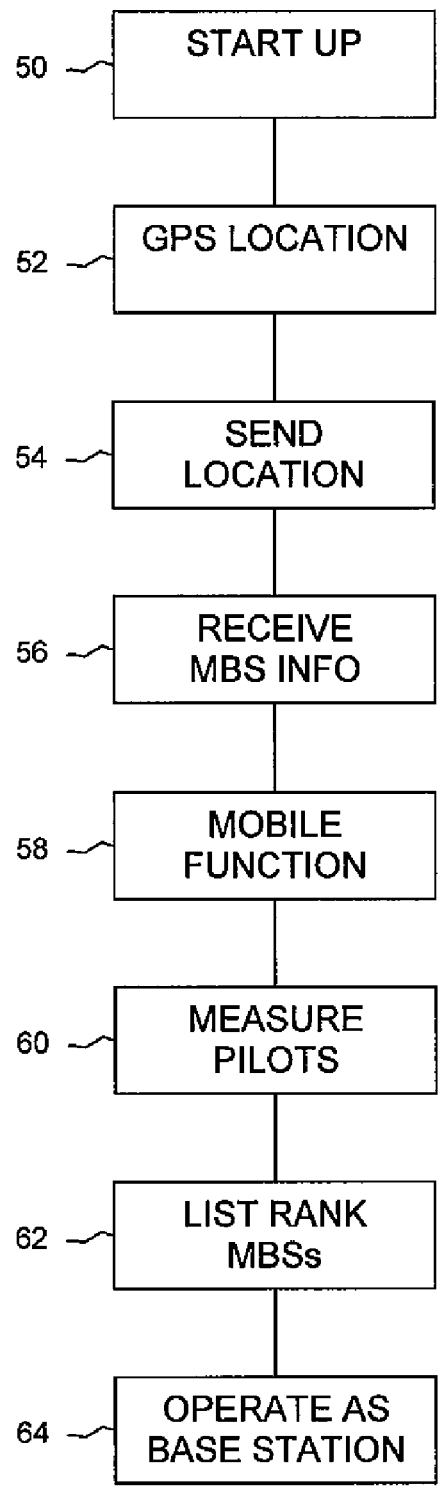
FIG. 3 is a flow diagram of a method of one embodiment.

Operation of the disclosed embodiments will be described with reference to the flow chart of FIG. 3. At step 50, the HBS 22 is started, e.g. the system is installed and power is turned on. The startup step may be repeated whenever power is restored to HBS after a power outage or upon another restart event, e.g. manual activation of a reset or restart button or receipt of a restart command from a remote server. The HBS 22 may be programmed to automatically restart or recheck or audit on a daily basis or more often to ensure that the neighbor list is up to date.

At step 52, the HBS 22 uses the GPS unit 32 to determine the location, i.e. latitude and longitude of the HBS 22. At step 54, the HBS 22 transmits the GPS location information to the server 40. The server 40 is operated by the telephone service provider which may have provided the HBS 22 to an end user, e.g. an occupant of the residence 20. The server 40 stores information identifying all MBSs in the service providers cellular network. The server 40 determines which MBSs are within a preselected distance, e.g. five or ten kilometers, from the location of the HBS 22. In one embodiment, the preselected distance may be set to a default value of one hundred kilometers. The server 40 then sends the identifying information for the MBSs back to the HBS 22 at step 56. The identifying information, for example, includes the distance to each MBS, the switch ID of the mobile switching center serving each MBS, the RF channel and PN (pseudonoise) codes for each MBS, and other information.

At step 58, the HBS 22 activates its mobile, or over the air receiver, function 34 so that it may operate like a MU. At step 60, the HBS 22 uses the mobile function 34 to receive and measure the pilot signal strength from each of the MBSs which were identified by the server 40. It would be expected that the closest MBS would have the strongest signal. For example, in FIG. 1, MBS 14 is illustrated as the closest MBS and would be expected to have a stronger signal at HBS 22. However, that is often not the case. Due to various topography features, the signal from MBS 12 or another MBS may be stronger at the HBS 22. The use of the mobile function 34 allows each of the MBSs identified by server 40 to be ranked in the order of the strongest signal to the weakest.

CDMA MBSs have an average operating range of about five kilometers, i.e. cells have a radius of about five kilometers. However, under some circumstances a MBS may provide good signal strength at a distance of ten kilometers or more. It is therefore desirable to program the server 40 to identify all MBSs within at least five kilometers of the location of the HBS 22 and may be desirable to identify all MBSs within ten kilometers or more. Regardless of which range has been selected, it is possible that at step 60, the HBS 22 mobile function will not be able to receive and measure the power of pilot signals from all the identified MBSs. Depending on where the HBS 22 is installed within the residence 20, signals from outside the residence 20 may be greatly attenuated. The attenuation of cellular signals by structural walls is one of the main reasons for RF holes in residences.

At step 62, the HBS 22 produces a ranked neighbor list. The list includes identifying information for all of the MBSs which were identified by the server 40. The MBS which had the highest pilot strength at step 60 will be ranked first. The remaining MBSs will be ranked in descending order of pilot signal strength. For those identified MBSs whose pilot signals could not be detected or measured, the MBSs may be ranked at the bottom of the list in any order, but preferable in the order of increasing distance from the HBS 22.

At step 64, the HBS 22 deactivates the mobile function 34 and operates as a conventional base station. Deactivation of the mobile function 34 may also occur immediately after step 60 or at the same time as step 62. The HBS provides its own pilot signal and broadcasts its neighbor list to the MUs which it serves, for example MU 26. The HBS is preferably operated at a power level which does not interfere with MUs outside the private cell 24, e.g. the MU 28. If the MU 26 is moved outside the residence 20, HBS 22 should provide sufficient signal strength within the cell 24 which may extend into the lawn areas surrounding the residence 20. If the MU 26 is moved outside the cell 24, the MU 26 should detect a decrease in pilot strength from HBS 22 and an increase in pilot strength from MBS 14, which should trigger a handoff from HBS 22 to MBS 14 following conventional hand off processes.

In some circumstances, when MU 26 moves out of cell 24 the MU 26 may find that the pilot strength from MBS 12, or some other cell, is stronger than the pilot strength from MBS 14. For example, MBS 14 may be serving its maximum numbers of MUs and may have reduced it output power to shift load to other cells. MBS 12 may be the second ranked MBS in the neighbor list and would be checked by the MU 26 for service after MBS 14. One purpose of ranking the neighbor list as discussed herein is to increase the percentage of successful handoffs by directing the MUs to the MBSs most likely to have good signal strength.

While the disclosed embodiments are directed to a base station in a private residence, it is apparent that the present disclosure is equally applicable to other embodiments. The HBS 22 may be used in other locations such as business premises, schools, libraries, etc. Any enclosed structure is likely to generate an RF hole with poor service from the MBSs and service may be improved by installation of an HBS in the structure. Self configuration of a neighbor list in the public MBSs would also reduce the cost of installing and operating such public MBSs.

Figure 4:
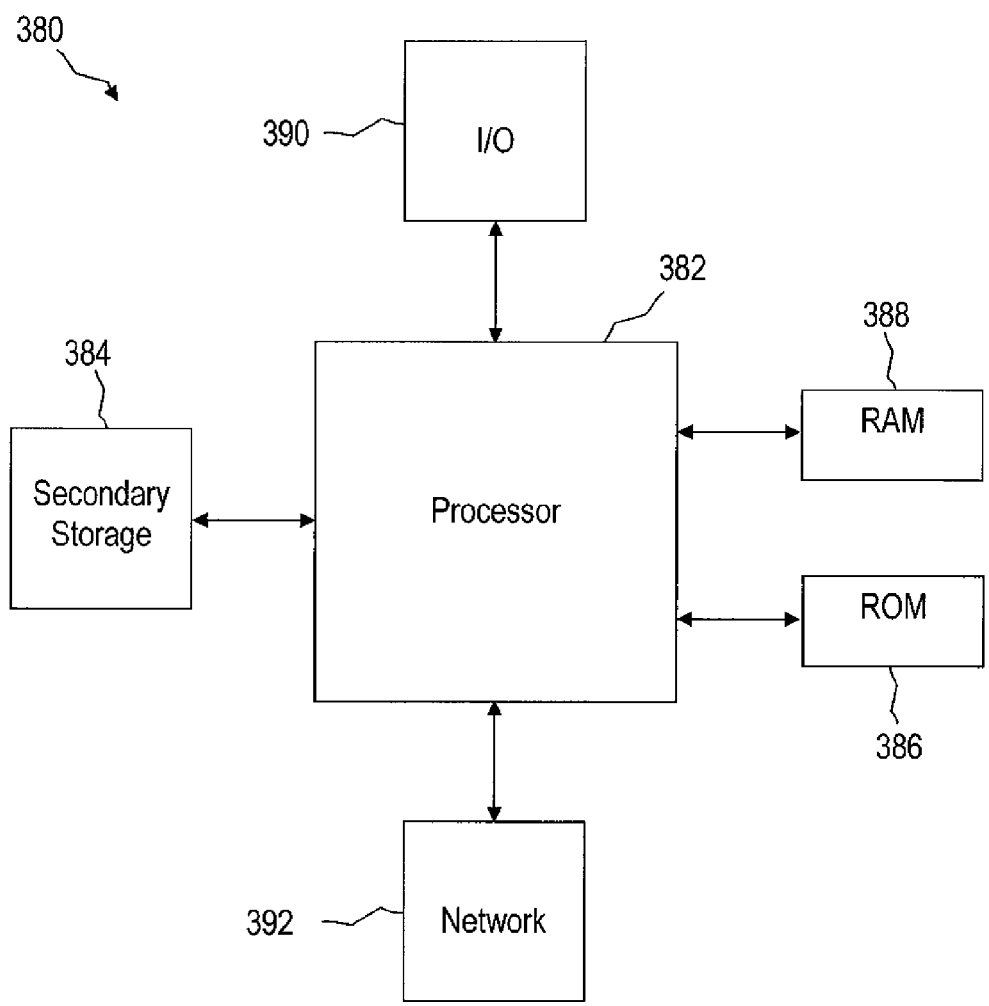
FIG. 4 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A code division multiple access underlay base station, the base station comprising:
a first apparatus configured to automatically obtain information identifying all macro base stations within a preselected distance of the underlay base station, automatically generate a neighbor list of the identified macro base stations based on pilot signal strengths of the identified macro base stations measured by the underlay base station, provide the neighbor list generated by the underlay base station to mobile units served by the underlay base station, and operate the underlay base station at a power level selected to provide a coverage area of the underlay base station to a limited area surrounding a building; and
a second apparatus configured to rank macro base stations on the neighbor list whose pilot signals were not detected below macro base stations whose pilot signals were detected and in order of distance from the underlay base station.

2. The code division multiple access base station of claim 1, further comprising:
a cellular receiver apparatus configured to measure a pilot signal level of each macro base station on the neighbor list; and
wherein the second apparatus is configured to rank the macro base stations on the neighbor list according to the measured pilot signal levels.

3. The code division multiple access base station of claim 1, further comprising:
a global positioning satellite receiver configured to detect a location of the underlay base station; and a third apparatus configured to transmit the location to a server storing information identifying macro base stations and receive from the server information identifying all macro base stations within the preselected distance of the underlay base station.

4. The code division multiple access base station of claim 1, wherein the underlay base station is located in a private premises.

5. The code division multiple access base station of claim 1, wherein the preselected distance is equal to or less than five kilometers.

6. The code division multiple access base station of claim 1, wherein the preselected distance is equal to or less than ten kilometers.

7. A code division multiple access telecommunications network, the network comprising:
   a plurality of macro base stations; and
   an underlay base station comprising a global positioning satellite receiver, the underlay base station configured to obtain information identifying all macro base stations within a preselected distance of the underlay base station, generate a neighbor list of the identified macro base stations based on pilot signal strengths of the identified macro base stations measured by the underlay base station, provide the neighbor list generated by the underlay base station to mobile units served by the underlay base station, and operate at a power level selected to provide a coverage area of the underlay base station to a limited area surrounding a building, and rank macro base stations on the neighbor list whose pilot signals were not detected below macro base stations whose pilot signals were detected and in order of distance from the underlay base station.

8. The code division multiple access telecommunications network of claim 7, wherein the underlay base station further comprises a mobile unit receiver and is further configured to receive and measure a strength of a pilot signal from each of the macro base stations and to rank the identified macro base stations based on the measured pilot signal strengths.

9. The code division multiple access telecommunications network of claim 7, wherein the underlay base station is installed in a private premises.

10. The code division multiple access telecommunications network of claim 9, wherein the underlay base station is configured to provide service in an area comprising primarily only the private premises.

11. A method for an underlay base station in a code division multiple access telecommunications network, the method comprising:
   configuring the underlay base station to, upon startup, determine a geographic location of the underlay base station from a global positioning satellite receiver apparatus, transmit the location to a server containing information identifying macro base stations, receive from the server identifying information for macro base stations within a preselected distance from the underlay base station, generate a neighbor list of macro base stations using the identifying information for the macro base stations based on pilot signal strengths of the macro base stations measured by the underlay base station, provide the neighbor list generated by the underlay base station to mobile units served by the underlay base station, and operate at a power level selected to provide a coverage area of the underlay base station to a limited area surrounding a building;
   configuring the underlay base station to rank macro base stations on the neighbor list whose pilot signals were not detected below macro base stations whose pilot signals were detected and in order of distance from the underlay base station; and
   installing and starting the underlay base station.

12. The method of claim 11, further comprising:
   configuring the underlay base station to receive and determine a strength of pilot signals from each of the macro base stations and to rank the macro base stations on the neighbor list according to the measured pilot signal strengths.

13. The method of claim 11 further comprising:
   installing the underlay base station in a private premises.

14. The method of claim 11, wherein the underlay base station communicates with the server via a wired connection.

15. The method of claim 14, wherein the underlay base station communicates with the server via a high speed connection selected from a group consisting of cable, DSL (digital subscriber line), and optical fiber connections.

16. The method of claim 11, further comprising an overlay cell overlaying the underlay base station cell.

17. The method of claim 16, wherein at least one of the mobile units uses the neighbor list to switch from the underlay base station cell to the overlay cell.

18. The method of claim 17, wherein the mobile units are selected from a group consisting of mobile phones, cell phones, wireless communication devices, personal digital assistants, portable computers, laptop and table computers.

19. The code division multiple access base station of claim 1, wherein at least one of the mobile units uses the neighbor list to switch from the underlay base station cell to an overlay cell.

20. The code division multiple access telecommunications network of claim 8, wherein the underlay base station is further configured to communicate with the server via a wired connection.

* * * * *